United States Patent [19]

Slater

[11] Patent Number: 4,465,105
[45] Date of Patent: Aug. 14, 1984

[54] FLEXIBLE HOSE

[75] Inventor: Christopher J. Slater, Grimsby, England

[73] Assignee: Dunlop Limited, London, England

[21] Appl. No.: 423,265

[22] Filed: Sep. 24, 1982

[30] Foreign Application Priority Data

Mar. 23, 1982 [GB] United Kingdom ................ 8208403

[51] Int. Cl.³ ............................................. F16L 55/00
[52] U.S. Cl. ..................................... 138/104; 138/109
[58] Field of Search ............... 138/103, 104, 109, 111, 138/114, 137, 141, 153, 172, 174; 73/40.5, 49.1

[56] References Cited

U.S. PATENT DOCUMENTS

| | | | |
|---|---|---|---|
| 1,883,086 | 10/1932 | Swartz | 138/109 |
| 3,172,428 | 3/1965 | Tudge | 138/172 |
| 3,339,415 | 9/1967 | Wild | 73/40.5 R |
| 3,717,180 | 2/1973 | Ambrose et al. | 138/153 |
| 3,860,043 | 1/1975 | Kutnyak et al. | 138/153 |
| 3,972,223 | 8/1976 | Torghele | 138/104 |
| 4,153,079 | 5/1979 | Ambrose | 138/104 |
| 4,259,553 | 3/1981 | Tanaka et al. | 138/104 |
| 4,349,049 | 9/1982 | Silvey | 138/104 |

FOREIGN PATENT DOCUMENTS 153320 12/1979 Japan ................................ 138/103

Primary Examiner—John W. Shepperd
Attorney, Agent, or Firm—Stevens, Davis, Miller & Mosher

[57] ABSTRACT

A flexible hose comprising a main fluid retaining carcass and a secondary fluid retaining carcass enclosing at least part of said main carcass, said hose including means to collect and detect fluid leaking from said main carcass. Said means comprises a circumferential opening formed in a nipple portion of an end fitting to which corresponding one ends of said main and secondary carcasses are connected and an axially extending passage leading from said opening to a leak detector.

10 Claims, 7 Drawing Figures

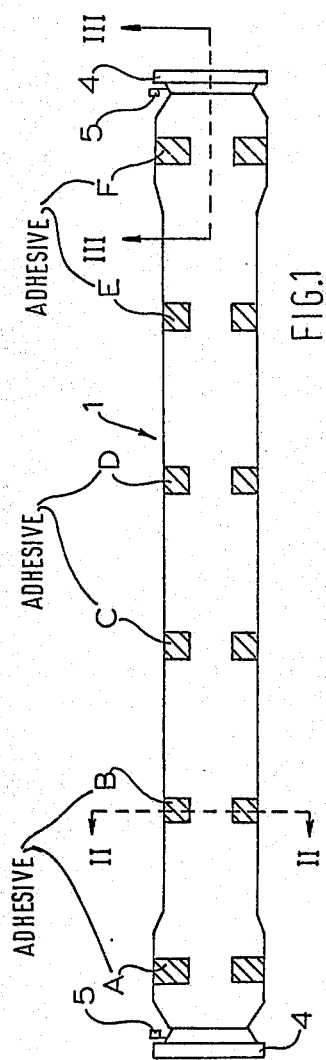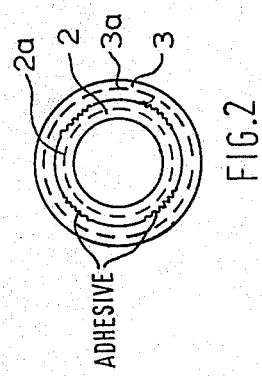

FLEXIBLE HOSE

This invention concerns improvements in or relating to flexible hose and in particular to flexible hose of the type comprising a main fluid retaining carcass and a secondary fluid retaining carcass enclosing at least part of the length of the main carcass to prevent escape of fluid leaking from the main carcass.

Flexible hose of the type referred to above is particularly useful for transporting fluids the escape of which would constitute a severe health or safety hazard and is especially suited to applications where the hose is required to withstand a considerable amount of flexing in use, rough handling during connecting operations and severe weathering, for example as may occur when the hose is used to transport oil from a tanker moored offshore to an installation onshore.

Although the secondary carcass may be constructed to provide a load-bearing capability similar to that of the main carcass whereby operation of the hose may continue unaffected should fluid leak from the main carcass it is desirable to provide a means of detecting such leakage so that the damaged hose may be replaced before failure of the secondary carcass occurs. In assignee's earlier U.K. Pat. No. 1 503 502 a flexible hose of the type referred to above is disclosed in which the secondary carcass is constructed to expand radially under the pressure of fluid leaking through the main carcass which is retained by the secondary carcass and the latter is provided with external surface markings which distort on expansion of the secondary carcass to provide a visible indication of main carcass failure. For certain applications, however, a visible indication of the main carcass failure is not practical e.g. where the hose or part of the hose is submerged and in our U.K. Pat. No. 1 578 316 a warning device is disclosed which is operable to detect expansion of the secondary carcass and generate a warning signal which provides an indication of main carcass failure to the operator. A disadvantage of this device is that it is mounted externally of the hose and is operable to detect radial expansion of the secondary carcass at one axial position along the length of the hose only. Accordingly where leakage occurs at a point axially spaced from the warning device a considerable volume of fluid must leak before sufficient radial expansion of the hose occurs to activate the warning device. As a result excessive expansion of the secondary carcass may occur in the vicinity of the leak causing not only the reinforcement structure of the secondary carcass to become highly distorted but also the displacement and therefore the underwater weight of the hose to change significantly both of which are undesirable for the following reasons. The ability of the reinforcement structure to withstand the pressure of the leaked fluid is reduced by distortion of the reinforcement structure from its original configuration so that in certain conditions premature failure of the secondary carcass may occur. The delicate balance between added buoyancy and hose weight necessary to maintain an optimum configuration of successive hose lengths in a submerged hose line to minimize stresses in the hose line is disturbed by any significant change in the underwater weight of one of the hose lengths which may have a deleterious affect on all the hose lengths in the hose line.

It is an object of the present invention to provide flexible hose of the type referred to above incorporating means of detecting main carcass failure which mitigates at least some of the problems and disadvantages of the foregoing known methods and devices.

According to the present invention there is provided a flexible hose comprising a main fluid retaining carcass, a secondary fluid retaining carcass which encloses at least part of the main carcass, the main and secondary carcasses being connected at corresponding one ends to a nipple portion of an end fitting, the nipple portion having a circumferentially-extending opening to which fluid leaking from the main carcass may pass and an axially extending passage leading from the opening to a leak detector.

Preferably the opening is continuous in the circumferential direction to allow collection of leaked fluid at any position around the circumference of the end fitting. In a preferred construction the opening comprises an annular groove formed in the radially outer surface of the nipple adjacent to and axially outwards of the end of the main carcass. Conveniently the end of the main carcass abuts an annular rib on the nipple portion to which the secondary carcass is attached and the opening is formed in the radially outer surface of the rib. Preferably the leak detector is mounted externally of the hose on the end fitting and is operable in response to an increase in fluid pressure beyond a predetermined value to generate a warning signal. The warning signal may comprise a local audio and/or visual warning. Alternatively or in addition the warning signal may in turn be used to activate a warning device remote from the hose end fitting e.g. a buzzer or light at a main control panel.

Preferably the secondary carcass encloses the entire length of the main carcass and both the main and secondary carcasses are connected at each end to a respective end fitting and detection of fluid leakage is effected at both ends of the hose.

The hose may include one or more layers of buoyancy material so as to be self-floating. The hose may be of constant or varying bore diameter.

Preferably radial expansion of the secondary carcass relative to the main carcass is controlled in a predetermined manner to prevent excessive local expansion of the secondary carcass and ensure the leaked fluid flows along the length of the hose to either end fitting. Control of radial expansion may be effected by any of the methods disclosed in assigned co-pending U.K. patent application No. 8208402 titled "Improvements in or relating to flexible hose" for example selective bonding of the secondary carcass to the main carcass at positions spaced axially along the length of the hose and/or circumferential reinforcement, e.g. hoop plies, incorporated in the secondary carcass at positions spaced axially along the length of the hose.

Other features of the invention will be apparent from the following detailed description of one embodiment which is given by way of example only with reference to the accompanying drawings wherein:

FIG. 1 is a side view of a hose according to the present invention;

FIG. 2 is a section on the line 2—2 of FIG. 1;

FIG. 5 is a side view partly in section of the leak detector shown in FIGS. 1 and 3;

Figures 3, 4:
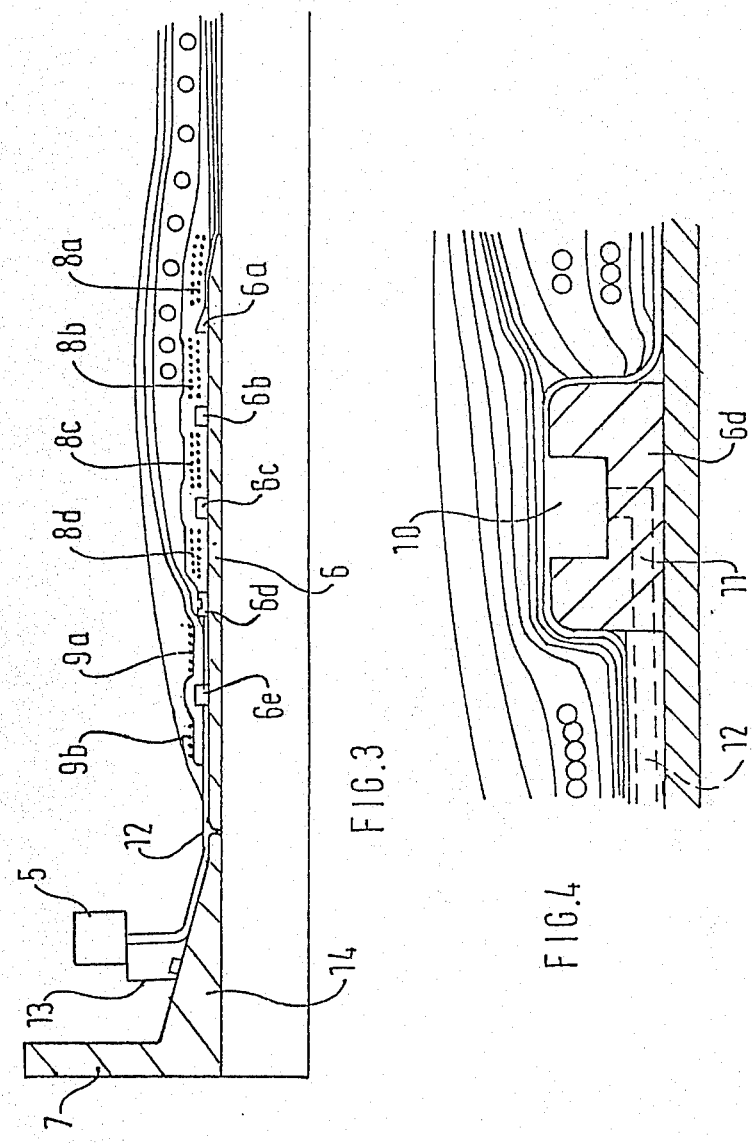
FIG. 3 is a section to an enlarged scale on the line 3—3 of FIG. 1.
FIG. 4 shows in cross-section to an enlarged scale the area X of FIG. 3.
Figure 6:
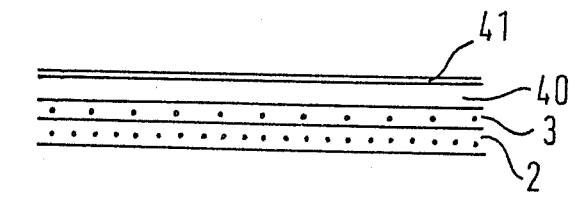
FIG. 6 is a longitudinal sectional view of part of a hose having a layer 40 of buoyancy material.
Figure 7:
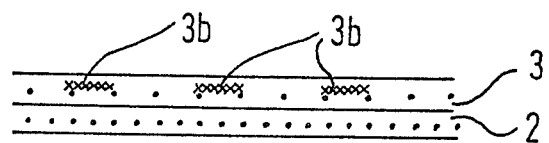
FIG. 7 is a longitudinal sectional view of a hose similar to that of FIG. 2 and having circumferential reinforcements 3b in the secondary carcass.

The hose 1 shown in the accompanying drawings comprises a main fluid retaining carcass 2 surrounded by and in contact with a secondary fluid retaining carcass 3, a respective end fitting 4 at each end of the hose to which the main and secondary fluid retaining carcasses 2 and 3 are secured and a respective leak detector 5 for detecting fluid leaking from the main carcass 2 mounted on each end fitting.

The main carcass 2 comprises an inner liner impermeable to the fluid to be transported, a reinforcement structure 2a and a cover. The reinforcement structure comprises several plies of steel wire cord helically wound at a lay angle of 50° (±5°) to the longitudinal axis of the hose with successive plies being of opposite hand to provide a balanced construction and a single coil of helically wound steel wire. The secondary carcass 3 comprises an inner liner of polymeric material, a reinforcement structure 3a and a cover which forms the outer cover of the hose and is capable of withstanding the conditions to which the hose is subjected in use. The reinforcement structure comprises several plies of high extension cord helically wound at a lay angle of 60° (±5°) to the longitudinal axis of the hose with successive plies being of opposite hand to allow the secondary carcass to expand radially relative to the main carcass when placed under internal pressure by fluid leaking from the main carcass.

As best shown in FIGS. 1 and 2 the liner of the secondary carcass is bonded to the cover of the main carcass at six axially spaced positions, A through F, along the length of the hose to control radial expansion of the secondary carcass relative to the main carcass with the bonding at each axial position being in four circumferentially spaced regions to allow leaked fluid to flow along the length of the hose to either end fitting. In addition the secondary carcass is provided with six circumferentially extending hoop plies (not shown), one at each of the six axially spaced positions A through F, radially outwards of the reinforcement structure and formed from a low extension cord, e.g. wire cord, wrapped around the hose. The hoop plies reinforce the bonds between the main and secondary carcasses and, being formed from cords having a lower extension than the cords of the reinforcement structure, control radial expansion of the secondary carcass in the event of any of the bonds failing due to effects of fatigue or degradation following leakage of fluid, e.g. oil, from the main carcass.

Each end fitting 4 is similar and, as shown more clearly in FIG. 3, comprises an axially extending nipple portion 6 to which corresponding one ends of the main and secondary carcasses 2 and 3 respectively are connected and a radially extending flange 7 for connection to a successive hose length (not shown) or to a fluid input/output (not shown). The nipple portion 6 has five axially spaced circumferential ribs 6a, 6b, 6c, 6d and 6e. Each end of the main carcass 2 passes over the ribs 6a, 6b and 6c and abuts the rib 6d of the associated end fitting 6 and is connected thereto by four axially spaced inextensible beads 8a, 8b, 8c and 8d each consisting of two wire windings. The secondary carcass 3 is slightly longer than the main carcass 2 and each end of the secondary carcass 3 passes over the ribs 6d and 6e of the associated end fitting and is connected thereto by two axially spaced inextensible beads 9a, 9b, each consisting of single wire winding.

As shown in more detail in FIG. 4 the rib 6d has a channel 10 formed in the radially outer surface thereof which is continuous in a circumferential direction and an internal bore 11 leading from the base of channel 10 and extending in the axial direction towards the flange 7 of the associated end fitting. An axially extending small bore steel tube 12 connected at one end to the bore 11 projects beyond the end of the secondary carcass 3 and is connected at the other end to the leak detector 5 attached via a mounting 13 to an outwardly flared body portion 14 of the associated end fitting.

The leak detector 5 shown in more detail in FIG. 5 is a self-contained unit comprising a rigid, pressure resistant water-tight casing 15 housing a sensor 16, electrical control unit 17, light 18, acoustic transducer 19 and batteries 20.

Casing 15 comprises a rectangular open-topped box 21 having a peripheral flange 22 around the opening and a cover 23 secured thereto by releasable fastening means (not shown) extending through aligned apertures 24, 25 in the flange 22 and cover 23. A gasket 26 clamped around the periphery thereof seals the casing 15 against ingress of water. Cover 23 includes a detachable pressure resistant transparent dome 27 in which the light 18 is positioned and the acoustic transducer 19 is located alongside the dome 27.

Sensor 16 comprises a pressure sensitive electrical switch 28 which is releasably connected to tube 12 by a length of small bore flexible tube 29 and is operable in response to an increase in fluid pressure above a predetermined level to trigger control unit 17 which in turn activates the light 18 and acoustic transducer 19 powered by the batteries 20. The control unit 17 is programmed to activate both devices 18 and 19 intermittently for predetermined periods of time so as to conserve battery life and the batteries 20 are of the sealed lead acid type capable of being re-charged.

In use of the above-described hose, the pressure of fluid which leaks through the main carcass 2 causes radial expansion of the secondary carcass 3 relative to the main carcass generating a small gap therebetween. The extent of radial expansion is controlled by the bonding between the carcasses reinforced by the hoop plies so that undesirable excessive local expansion of the secondary carcass is prevented and the leaked fluid flows axially along the hose length towards one or both end fittings 4. On reaching an end fitting the fluid flows between the secondary carcass 3 and top of rib 6d and is collected in the channel 10. The fluid then flows around the channel 10 to bore 11 from where it passes via tubes 12, 29 to sensor 16. When the fluid pressure reaches a predetermined level the pressure switch 28 is operable to trigger the control unit 17 which in turn activates the transducer 19 and light 18. The signal produced by the transducer 19 may be used to activate remote visual and/or audio warning devices e.g. on a surface buoy or on a control panel while operation of the light 18 provides a local indication at the hose in which leakage has occurred.

The invention is not restricted to the abovedescribed embodiments which may be modified in a number of ways. For example the hose may include one or more layers of buoyancy material so as to be self-floating. For certain applications of the hose selective bonding of the secondary carcass to the main carcass and/or the use of hoop plies may be omitted. Each hose may have a leak detector on one end fitting only and this may be of any type capable of sensing a pressure increase due to leaked fluid and triggering an appropriate warning device or signal. The reinforcement structures of the main and secondary carcasses may be modified to suit any desired load requirement of the finished hose. The pressure switch may be of any known type.

Having now described my invention—what I claim is:

1. A flexible hose comprising a main fluid retaining carcass, a secondary fluid retaining carcass which encloses at least part of said main carcass, said main and secondary carcasses being connected at corresponding one ends to a nipple portion of an end fitting, said nipple portion having an annular rib adjacent to and axially outwards of the end of said main carcass, and a circumferentially continuous groove formed in the radial outer surface of said rib whereby fluid leaking from said main carcass may pass into and flow around said groove, and an axially extending passage leading from said groove to a leak detector.

2. A hose according to claim 1 wherein said leak detector is mounted on said end fitting externally of said main and secondary carcasses.

3. A hose according to claim 2 wherein said leak detector is operable in response to an increase in fluid pressure beyond a predetermined value to generate a warning signal.

4. A hose according to claim 3 wherein said leak detector includes a control unit triggered by an increase in fluid pressure beyond said predetermined value to activate local and/or remote warning device(s).

5. A hose according to claim 4 wherein said local warning device(s) is/are activated intermittently.

6. A hose according to claim 1 wherein said secondary carcass encloses the entire length of said main carcass and both said main and secondary carcasses are connected at each end to a respective end fitting.

7. A hose according to claim 6 wherein each end fitting has a nipple portion provided with an annular rib into which fluid leaking from said main carcass may pass.

8. A hose according to claim 1 including one or more layers of buoyancy material.

9. A hose according to claim 1 wherein means is provided to control the radial expansion of said secondary carcass relative to said main carcass.

10. A hose according to claim 9 wherein said secondary carcass has a respective circumferential reinforcement at positions spaced axially along the length of said hose.

* * * * *